Patented June 16, 1942

2,286,762

UNITED STATES PATENT OFFICE 2,286,762

COATED RUBBER ARTICLE

George F. Rishor, Peterborough, Ontario, Canada, assignor to General Electric Company, a corporation of New York No Drawing. Application December 19, 1940,
Serial No. 370,809
In Canada August 8, 1940

7 Claims. (Cl. 117—139)

My invention relates to electrical conductor cords and the like, and particularly to rubber covered cords having an improved surface coating and to coating compositions for such articles.

For some purposes it is desirable to apply a coating to the surface of rubber covered electrical cords, whereby the cord will be non-tacky, will have an attractive appearance and can be finished in a variety of colors. It has been suggested to use for such purposes a coating composition having as an essential constituent crude rubber which has been broken down by extreme mastication so that it is flat or dead-milled. Pigments are incorporated in the dead-milled rubber by mixing and a coating solution is obtained by incorporating the mixture in a solvent. The coating is applied to the surface of the cord in a thin coat in any suitable manner and then is cured by means of sulphur chloride fumes.

A cord thus coated has a very attractive and satisfactory surface finish which is firmly bound to the rubber base and has good electrical characteristics. However, it is found that when the vulcanized rubber cord with the dead-milled rubber coating has been cured in sulphur chloride fumes to a sufficient degree to obtain the desired non-tacky, smooth surface, the tensile strength of the rubber on the cord is decreased to some extent, particularly the tensile strength noted after accelerated aging tests. This decrease in tensile strength is probably due to the over-curing of the skin of the previously vulcanized rubber covering by the sulphur chloride or to the fact that when the rubber with the cured coating is stretched, the cured coating does not stretch as much as the rubber and cracks in numerous places before the rubber breaks. Due to the very firm bond of the cured coating to the rubber underneath, the cracks which develop in the cured coating on stretching extend on down into the rubber and cause a premature breakage at a lower tensile strength of the rubber.

In accordance with my invention, I produce an insulated cord having the desirable characteristics and advantages of that above described without the accompanying disadvantages by use of a coating comprising dead-milled rubber which has been modified by the addition of other materials whereby the tensile strength of the cord, especially after aging, is not reduced to any great extent by the application of the coating. Briefly, I incorporate in the dead-milled rubber coating a proportion of a reaction product of rubber and a halogen acid of tin.

The dead-milled rubber is prepared by milling rubber, preferably pale crepe rubber if the coating to be applied is light-colored, until it is an inert semi-fluid mass and has a plasticity figure of 72 to 75, as determined by the Goodrich Simplified Plastometer, 24 hours after milling. Suitably sized batches of the dead-milled rubber and pigments are then placed in a mixing mill and thoroughly mixed. Due to the broken down condition of the rubber, the pigment is intimately dispersed in and thoroughly wetted by the rubber during this mixing operation. The time required for mixing is not critical. The pigments used to provide the desired colors are those well-known to the rubber compounding art. For further particulars of the manufacture of the dead-milled rubber and pigment composition thus far described and for details of compositions of some of the color mixtures to be obtained, reference is made to United States Patent 2,196,060 Crowell et al., dated April 2, 1940, and assigned to the same assignee as the present invention.

In accordance with the present invention, I incorporate with the dead-milled rubber compositions a proportion of a reaction product of rubber and a halogen acid of tin, as, for example, hydrated chlorostannous ($HSnCl_3.3H_2O$) or hydrated chlorostannic acid ($H_2SnCl_6.2H_2O$). Such reaction products are described, for example, in Bruson United States Patent No. 1,797,188, and are produced and sold by the Goodyear Tire and Rubber Company, Akron, Ohio, under the trade name of "Pliolite." A coating solution is preferably prepared by mixing together a solution of the dead-milled rubber composition in solvent naphtha and a solution of "Pliolite" in solvent naphtha and diluting the mixture with solvent until the coating solution is of the consistency required to give the thickness of coating desired.

As a practical example, I mix a dead-milled rubber and pigment composition in 68° solvent naphtha in proportions such that there are 12 ounces of rubber to a gallon of naphtha. I dissolve "Pliolite" resin of a grade obtainable on the market as S–112–V–1, 14 ounces in one gallon of 68° solvent naphtha. These two solutions are mixed in equal proportions to form the coating solution. The surface of the vulcanized rubber cord to be coated should be clean and free from materials such as paraffin wax, talc, or other material which would interfere with the union of the coating.

The cord is drawn through a bath of the coating solution in a continuous manner and passes directly into a chamber where it is subjected to the action of sulphur chloride fumes. I have found that treatment of the coating in sulphur chloride fumes conveniently produces a satisfactory cure of the coating, but other known curing agents may be used.

A rubber covered article, such as an insulated wire, produced as above described has a tough, durable, dry finish which adheres to the covering of the article without cracking or checking during flexing thereof or during abrasion of the coating, and is not subject to any material reduction in tensile strength due to the application of the coating.

I have found that rubber cord coated with a mixture of dead-milled rubber and "Pliolite" has superior qualities in many respects to a cord having a coating of either material alone. I have found that the proportions of dead-milled rubber and "Pliolite" used to obtain the new coating may vary widely and have obtained satisfactory results from the use of an admixture of a relatively small proportion of "Pliolite." On the other hand, I have used with success a coating solution with "Pliolite" and dead-milled rubber in the proportions of 2 to 1.

What I claim as new and desire to secure by Letters Patent of the United States is:

1. An article having a vulcanized rubber covering coated with a vulcanized film of a composition comprising dead-milled rubber milled until it has a plasticity figure of 72 to 75 by the Goodrich Simplified Plastometer and a substantial proportion of a reaction product of rubber and halogen acid of tin.

2. A cord having a vulcanized rubber covering and a thin coating on said covering comprising a vulcanized mixture of dead-milled rubber milled to an inert semi-fluid mass and a substantial proportion of a reaction product of rubber and a halogen acid of tin.

3. A rubber article coated with a vulcanized mixture of dead-milled rubber milled until it is an inert semi-fluid mass and the reaction product of rubber and a halogen acid of tin.

4. A rubber covered article having a protective flexible surface coating comprising a vulcanized mixture of dead-milled rubber milled until it is an inert semi-fluid mass and a reaction product of rubber and a chlorine-containing acid of tin.

5. A coating composition comprising a solvent, dead-milled rubber milled until it is an inert semi-fluid mass and the reaction product of rubber and a halogen acid of tin.

6. A protective coating for rubber surfaces comprising a pigment, a mixture of dead-milled rubber milled until it is an inert semi-fluid mass and a reaction product of rubber and a halogenated acid of tin.

7. A protective coating composition for rubber surfaces containing a solvent, a pigment, approximately 12 parts by weight of a dead-milled rubber milled to a plasticity figure of 72 to 75 on the Goodrich simplified plastometer, and approximately 14 parts by weight of a reaction product of rubber and a chlorine-containing acid of tin.

GEORGE F. RISHOR.